(12) United States Patent
Xu et al.

(10) Patent No.: US 11,854,245 B2
(45) Date of Patent: Dec. 26, 2023

(54) GENERATIVE ADVERSARIAL NETWORKS HAVING RANKING LOSS

(71) Applicant: CARNEGIE MELLON UNIVERSITY, Pittsburgh, PA (US)

(72) Inventors: Felix Juefei Xu, Pittsburgh, PA (US); Marios Savvides, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 644 days.

(21) Appl. No.: 16/976,417

(22) PCT Filed: Apr. 29, 2019

(86) PCT No.: PCT/US2019/029645
§ 371 (c)(1),
(2) Date: Aug. 27, 2020

(87) PCT Pub. No.: WO2019/210303
PCT Pub. Date: Oct. 31, 2019

(65) Prior Publication Data
US 2021/0049464 A1 Feb. 18, 2021

Related U.S. Application Data

(60) Provisional application No. 62/762,293, filed on Apr. 27, 2018.

(51) Int. Cl.
*G06V 10/82* (2022.01)
*G06N 20/20* (2019.01)
(Continued)

(52) U.S. Cl.
CPC .............. *G06V 10/82* (2022.01); *G06F 17/11* (2013.01); *G06F 18/2113* (2023.01); *G06F 18/22* (2023.01); *G06N 3/045* (2023.01);
*G06N 3/047* (2023.01); *G06N 3/0455* (2023.01); *G06N 3/0475* (2023.01); *G06N 3/08* (2013.01);
(Continued)

(58) Field of Classification Search
CPC .... G06V 10/82; G06V 10/454; G06V 10/761; G06V 40/168; G06N 20/00; G06N 20/10; G06N 20/20; G06N 3/04; G06N 3/045; G06N 3/0455; G06N 3/047; G06N 3/0475; G06N 3/08; G06N 3/084; G06N 3/088; G06F 18/2113; G06F 18/22; G06F 17/11
See application file for complete search history.

(56) References Cited

U.S. PATENT DOCUMENTS

2014/0079314 A1 3/2014 Yakubovich et al.
2015/0363670 A1 12/2015 Sugishita et al.
(Continued)

OTHER PUBLICATIONS

International Search Report and Written Opinion for International Patent Application No. PCT/US2019/029645, dated Aug. 8, 2019, 7 pages.

*Primary Examiner* — Shane D Woolwine
(74) *Attorney, Agent, or Firm* — KDW Firm PLLC

(57) ABSTRACT

The invention specifies a method of improving a subsequent iterations of a generative network by adding a ranking loss to the total loss for the network, the ranking loss representing the marginalized difference between a discriminator score for a generated image in one iteration of the generative network and the discriminator score for a real image from a subsequent iteration of the generative network.

20 Claims, 4 Drawing Sheets

(51) Int. Cl.
  *G06F 17/11*    (2006.01)
  *G06N 3/08*     (2023.01)
  *G06F 18/2113*  (2023.01)
  *G06N 3/045*    (2023.01)
  *G06V 10/74*    (2022.01)
  *G06V 10/44*    (2022.01)
  *G06F 18/22*    (2023.01)
  *G06N 3/047*    (2023.01)
  *G06N 3/084*    (2023.01)
  *G06N 3/088*    (2023.01)
  *G06N 3/0455*   (2023.01)
  *G06N 3/0475*   (2023.01)
  *G06V 40/16*    (2022.01)

(52) U.S. Cl.
  CPC .............. *G06N 3/084* (2013.01); *G06N 3/088* (2013.01); *G06N 20/20* (2019.01); *G06V 10/454* (2022.01); *G06V 10/761* (2022.01); *G06V 40/168* (2022.01)

(56) References Cited

U.S. PATENT DOCUMENTS

2016/0035078 A1    2/2016  Lin et al.
2020/0293833 A1*   9/2020  Luo ........................ G06N 3/045
2020/0320769 A1*  10/2020  Chen ..................... G06F 18/214

* cited by examiner

GENERATIVE ADVERSARIAL NETWORKS HAVING RANKING LOSS

RELATED APPLICATIONS

This application is a national phase filing under 35 U.S.C. § 371 claiming the benefit of and priority to International Patent Application No. PCT/US2019/029645, filed on Apr. 29, 2019, which claims the benefit of U.S. Provisional Patent Application No. 62/762,293, filed Apr. 27, 2018. The entire contents of these applications are incorporated herein by reference.

GOVERNMENT RIGHTS

This invention was made with government support under contract 20131JCXK005 awarded by the Department of Justice and contract N6833516C0177 awarded by NavAir. The government has certain rights in the invention.

BACKGROUND OF THE INVENTION

Generative adversarial networks (GAN) and many of its variants can learn from the tremendous amount of data available and generate new instances that are like the data they have observed, in any domain. This line of research is extremely important because it has the potential to provide meaningful insight into the physical world we human beings can perceive.

Take visual perception for instance, the generative models have much smaller number of parameters than the amount of visual data available in the world, which means that, for the generative models to come up with new instances that are like the actual true data, they have to search for intrinsic pattern and distill the essence. As a result, machines can be made to understand, describe, and model the visual world better.

GANs simultaneously train a generator network for generating realistic images, and a discriminator network for distinguishing between the generated images and the samples from the training data (true distribution). The two players (generator and discriminator) play a two-player minimax game until Nash equilibrium where the generator is able to generate images as genuine as the ones sampled from the true distribution, and the discriminator is no longer able to distinguish between the two sets of images, or, equivalently, is guessing at random chance. In the traditional GAN formulation, the generator and the discriminator are updated by receiving gradient signals from the loss induced by observing discrepancies between the two distributions by the discriminator. GANs are able to generate images with the highest visual quality by far. The image details are sharp as well as semantically sound.

While there have been many GAN variants that show some improvements over the original GAN, there has not been much work dedicated to self-improvement of GAN, i.e. improving the GAN performance solely based on the self-play with previous versions of itself The performance of the GAN generator is directly affected by the GAN discriminator. In short, to make the generator stronger, a stronger opponent (discriminator) is needed. With a weak discriminator which does a poor job telling generated images from the true images, it takes only a little effort for the generator to win the two-layer minimax game as described in the original work of GAN To further improve upon the state-of-the-art GAN method, one possible direction is to enforce a maximum margin ranking loss in the optimization of the discriminator, which will result in a stronger discriminator that attends to the fine details of images. A stronger discriminator helps to develop a stronger generator.

Perhaps the most seminal GAN-related work since the inception of the original GAN is the Wasserstein GAN (WGAN). Efforts have been made to fully understand the training dynamics of generative adversarial networks through theoretical analysis, which leads to the creation of the WGAN.

The two major issues with the original GAN and many of its variants are the vanishing gradient issues and the mode collapse issue. By incorporating a smooth Wasserstein distance metric and objective, as opposed to the KL-divergence and JS-divergence used by GAN, the WGAN is able to overcome the vanishing gradient and mode collapse issues. WGAN also has made training and balancing between the generator and discriminator much easier in the sense that one can now train the discriminator till optimality, and then gradually improve the generator. Moreover, it provides an indicator (based on the Wasserstein distance) for the training progress, which correlates well with the visual image quality of the generated samples.

The GAN framework trains two networks, a generator $\mathcal{G}_\theta(z): z \to x$, and a discriminator $\mathcal{D}_x(z): x \to [0, 1]$. $\mathcal{G}$ maps a random vector z, sampled from a prior distribution $p_z(z)$, to the image space. $\mathcal{D}$ maps an input image to a likelihood. The purpose of $\mathcal{G}$ is to generate realistic images, while $\mathcal{D}$ plays an adversarial role to discriminate between the image generated from $\mathcal{G}$, and the image sampled from data distribution $p_{data}$. The networks are trained by optimizing a minimax loss function There are many ways to structure $\mathcal{G}(z)$. One method uses fractionally-strided convolutions to upsample images instead of fully-connected neurons. The generator $\mathcal{G}$ is updated to fool the discriminator $\mathcal{D}$ into wrongly classifying the generated sample, $\mathcal{G}(z)$, while the discriminator $\mathcal{D}$ tries not to be fooled. Here, both $\mathcal{G}$ and $\mathcal{D}$ are deep convolutional neural networks and are trained with an alternating gradient descent algorithm. After convergence, $\mathcal{D}$ is able to reject images that are too fake, and $\mathcal{G}$ can produce high quality images faithful to the training distribution (true distribution $P_{data}$).

WGAN avoids the gradient vanishing and mode collapse issues in the original GAN and many of its variants by adopting a new distance metric: the Wasserstein-1 distance, or the earth-mover distance. One of the biggest advantages of the Wasserstein distance over KL and JS-divergence is that it is smooth, which is very important in providing meaningful gradient information when the two distributions have support contained in two closed manifolds that don't perfectly aligned don't have full dimension, in which case KL and JS-divergence would fail to provide gradient information successfully.

SUMMARY OF THE INVENTION

Disclosed here is an improvement to the WGAN which incorporates a maximum margin ranking criterion in the optimization, and with a progressive training paradigm that self-improve the WGANs at later stages. The improvement is referred to herein as GoGAN, short for Gang of GANs.

The improvement includes generalizing on the WGAN discriminator loss with a margin-based discriminator loss and providing a self-improving training paradigm involving multiple versions of GANs to contribute to the maximum margin ranking loss, such that the GAN, at a later GoGAN stage, will improve upon early stages. The improvements provide a theoretical guarantee that the GoGAN will bridge the gap between true data distribution and generated data distribution by at least half.

DETAILED DESCRIPTION OF THE INVENTION

The GoGAN method is a progressive training paradigm to improve the GAN, by allowing GANs at later stages to contribute to a new ranking loss function that will improve the GAN performance further. At each GoGAN stage, the WGAN discriminator loss is generalized, and a margin-based discriminator loss is arrived at, which is referred to herein as the network margin GAN (MGAN).

The components of GoGAN will now be discussed with reference to FIG. 1, which shows the entire GoGAN flowchart.

As discussed above, WGAN has several advantages over the traditional GAN. Given that $\mathcal{D}_{w_i}(x)$ and $\mathcal{D}_{w_i}(\mathcal{G}_{w_i}(x))$ are the discriminator scores for the real image x and generated image $\mathcal{G}_{w_i}(x)$ in stage i respectively, then to further improve it, a margin-based WGAN discriminator loss is introduced as follows:

$$\mathcal{L}_{disc} = [\mathcal{D}_{w_i}(\mathcal{G}_{\theta_i}(z)) + \epsilon - \mathcal{D}_{w_i}(x)]_+ \quad (1)$$

where $[x]_{=max}(0, x)$ is the hinge loss. This MGAN loss function is a generalization of the discriminator loss in WGAN. When the margin $\epsilon \to \infty$, this loss becomes the WGAN discriminator loss. The margin ($\epsilon$) determines how big or small the gap is between the real image distribution and the generated image distribution at a particular stage.

The intuition behind the MGAN loss is as follows. WGAN loss treats a gap of 10 or 1 equally and it tries to increase the gap even further. The MGAN loss focuses on increasing separation of examples with gap 1 and leaving the samples with separation 10, which ensures a better discriminator, and hence a better generator. The MGAN loss can be extended even further by incorporating margin-based ranking when going beyond a single MGAN.

Encoder $\mathcal{E}$

Figure 1:
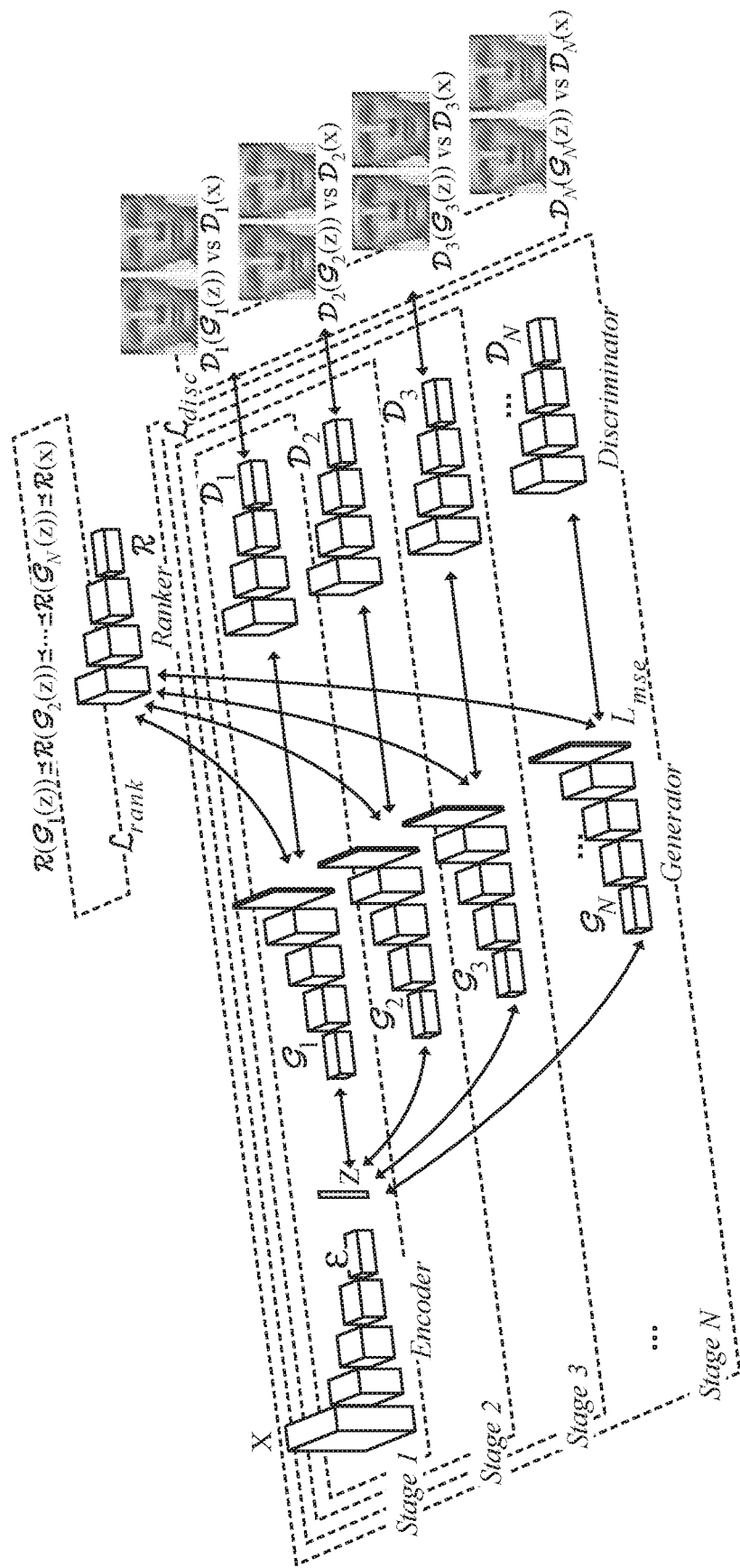
FIG. 1 is a graphical schematic showing the layout and operation of the GoGAN.

The encoder is connected to the rest of the GoGAN architecture as shown in FIG. 1. The encoder is needed to rank the images generated at a later stage closer to the image from the true distribution. This means an entry point needs to be created for the image x to go through (1) the generator and the discriminator, such that the margin-based discriminator loss $\mathcal{L}_{disc}$ can be properly computed, and (2) the generator and the ranker, such that the ranking loss $\mathcal{L}_{rank}$ can be properly computed. Based on the design principles for GAN, the best way is to attach an encoder at the beginning of the network architecture that takes the input image x and maps it to the latent vector $z = \mathcal{E}(x)$, which further goes through the generator and the rest of the GoGAN.

Ranker $\mathcal{R}$:

The ranking loss is:

$$\mathcal{L}_{rank} = [\mathcal{D}_{w_i}(\mathcal{G}_{\theta_i}(z)) + 2\epsilon - \mathcal{D}_{w_{i+1}}(x)]_+ \quad (2)$$

Combing equations (1) and (2), the $\mathcal{L}_{disc}$ and $\mathcal{L}_{rank}$ loss together are equivalent to enforcing the following ranking strategy. Notice that such ranking constraint only happens between adjacent GoGAN pairs, and it can be easily verified that it has intrinsically established an ordering among all the MGANs involved, which will be further discussed below.

$$\mathcal{D}_{w_{i+1}}(x) \geq \mathcal{D}_{w_{i+1}}(\mathcal{G}_{\theta_{i+1}}(z)) + \epsilon \quad (3)$$

$$\mathcal{D}_{w_{i+1}}(x) \geq \mathcal{D}_{w_i}(\mathcal{G}_{\theta_i}(z)) + 2\epsilon \quad (4)$$

The weights of the ranker $\mathcal{R}$ and the discriminator $\mathcal{D}$ are tied together. Conceptually, from Stage-2 and onward, the ranker is just the discriminator which takes in extra ranking loss in addition to the discriminator loss already in place for the MGAN.

In FIG. 1, the ranker is a separate block, but only for illustrative purpose. Different training stages are encircled by dotted lines with various transparency levels. The solid lines show the connectivity within the GoGAN, with various transparency levels in accordance with the progressive training stages. The arrows on both ends of the solid lines indicate forward and backward pass of the information and gradient signal. If the entire GoGAN is trained, the ranker will have achieved the following desired goal:

$$\mathcal{R}(\mathcal{G}_1(z)) \preceq \mathcal{R}(\mathcal{G}_2(z)) \preceq \mathcal{R}(\mathcal{G}_3(z)) \preceq \ldots \mathcal{D}$$
$$\mathcal{R}(\mathcal{G}_K(z)) \preceq \mathcal{R}(x) \quad (5)$$

where $\preceq$ indicates relative ordering.

In GoGAN, the entire model is updated by minimizing the following 3 loss functions: (1) the cross-entropy discriminator loss $\mathcal{L}_{disc}$ as commonly used in traditional GANs; (2) the ranking loss $\mathcal{L}_{rank}$; and (3) the reconstruction fidelity loss $\mathcal{L}_{mse}$ measured by the mean-squared error (MSE) between the generated images $\mathcal{G}_i(z)$ and the image from true distribution x, as commonly used in VAEs. The total loss for GoGAN is:

$$\mathcal{L}_{GoGan} = \lambda_0 \cdot \mathcal{L}_{mse} + \lambda_1 \cdot \mathcal{L}_{disc} + \lambda_2 \cdot \mathcal{L}_{rank} \quad (6)$$

where weighting parameters $\lambda_0$, $\lambda_1$ and $\lambda_2$ control the relative strength. MSE loss is computed right after the generative network. It computes the image-level fidelity (i.e., dissimilarity) between the ground-truth input image and the generated image. A higher MSE loss implies a greater difference between the generated image and the ground-truth image.

GoGAN with ranking loss as specified by equation (2) trained at its equilibrium will reduce the gap between the real data distribution $\mathbb{P}_r$ and the generated data distribution $\mathbb{P}_0$ at least by half for a Wasserstein GAN trained at its optimality.

Figure 2:
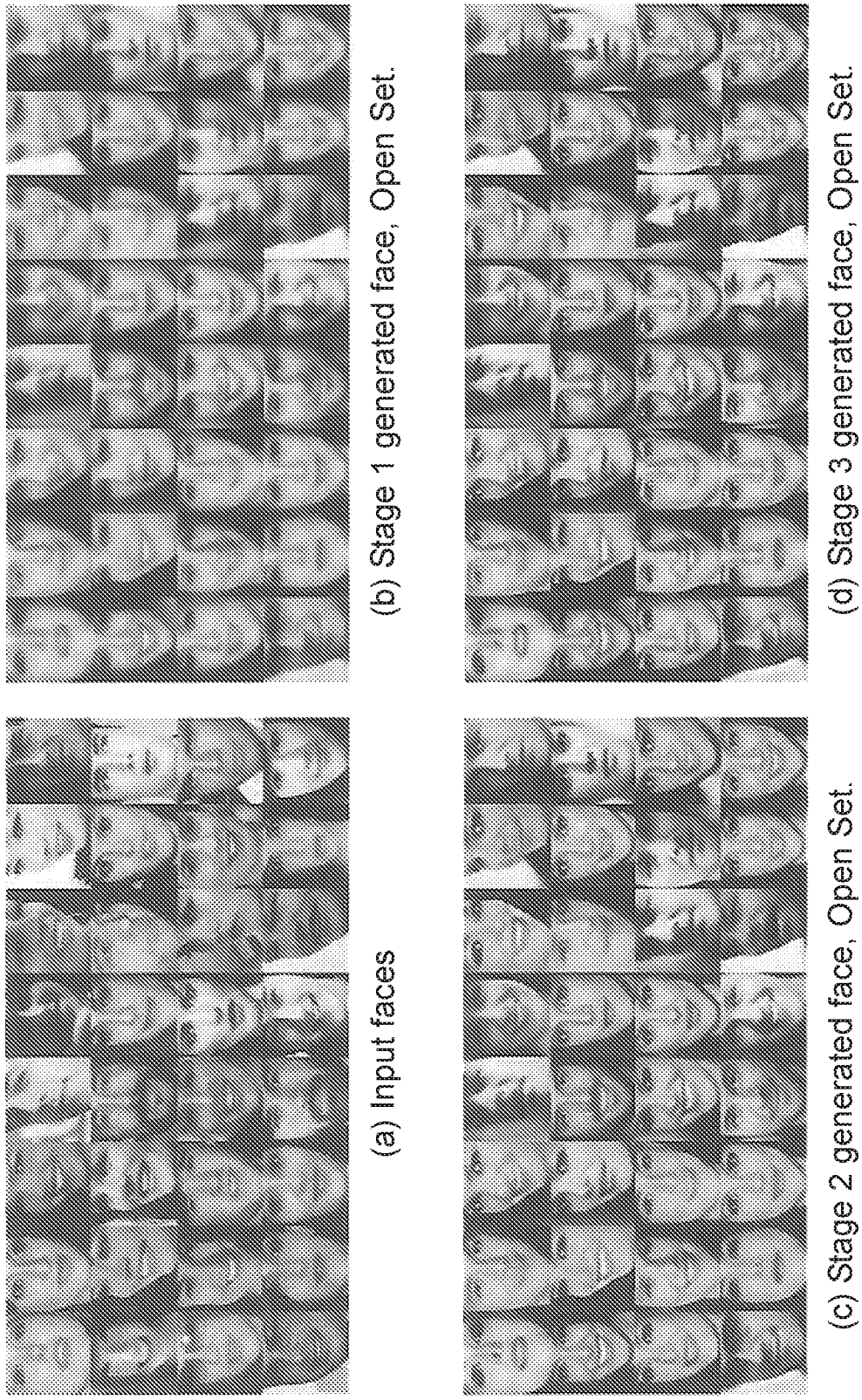
FIG. 2 shows face generation using the present invention wherein latent vectors are obtained by passing faces through an encoder.
Figure 3:
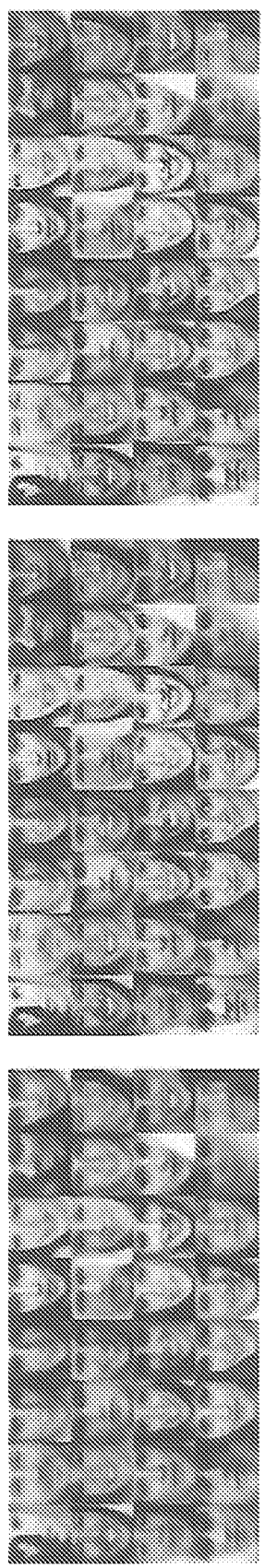
FIG. 3 shows face generation using the present invention wherein latent vectors are randomly generated without an encoder.

FIG. 2 shows open-set face generation visual results from various stages in GoGAN. Here the latent vectors z's are obtained by passing the input faces through the encoder $\epsilon$. FIG. 3 also shows open-set face generation visual results from various stages in GoGAN and latent vectors z's are randomly generated without the encoder $\epsilon$. From both cases, it can clearly be seen that as the stage progresses, the GoGAN is able to generate sharper face images which are visually more appealing.

Figure 4:
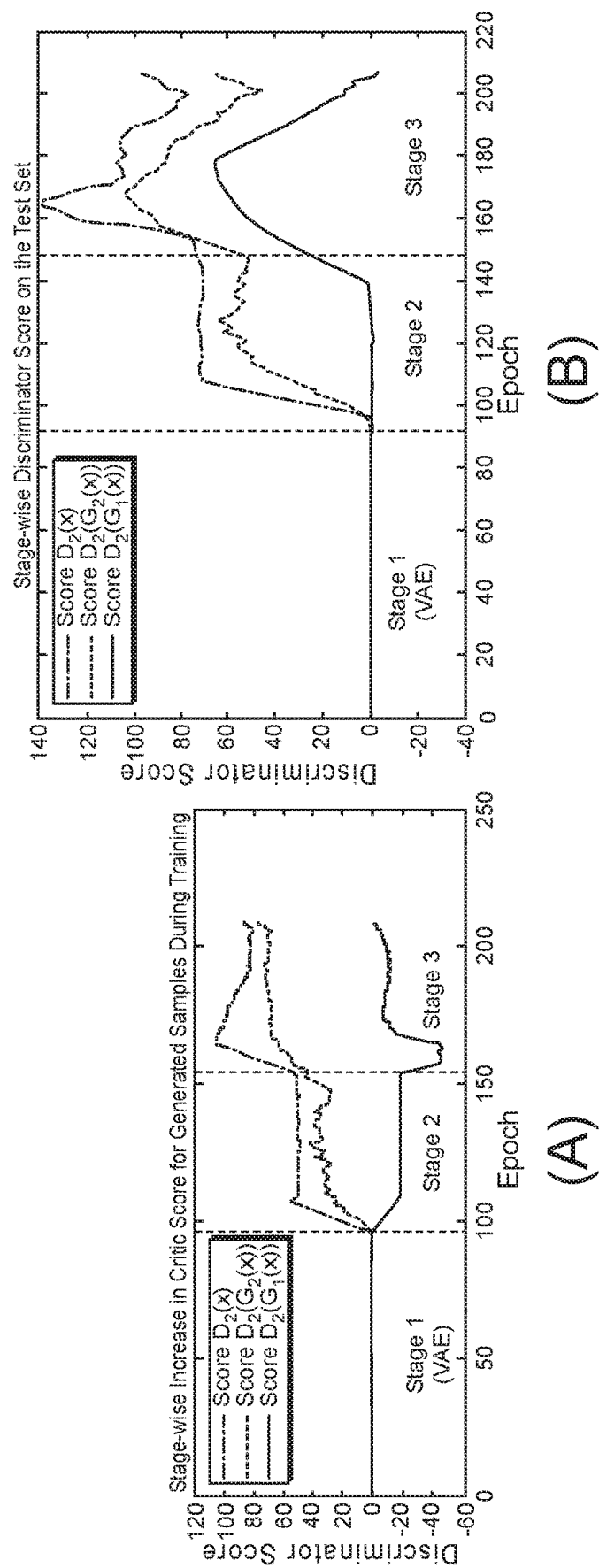
FIG. 4 shows graphs of discriminator scores during training in view (A) and during testing in view (B).

Both the FID and Inception score metrics show gradual improvement in the generated image quality with each stage, as can be observed visually from the generated images in FIG. 2 as well as FIG. 3. The Stage 1 (VAE) generated images are blurry. As the process proceeds through Stage 2 and Stage 3, the images get sharper and have more face-features. As can be seen in FIG. 4, the discriminator score of the real samples and of the samples generated by the previous stage generator are clamped, between which, the discriminator score of the current stage generator gradually increases. The clamping of discriminator scores is achieved by penalizing the difference between discriminator's scores between current and previous stage discriminators. The penalty added to discriminator's loss is given by:

$$\mathcal{L}_{clamp} = \lambda_{clamp}\{[\mathcal{D}_1(x) - \mathcal{D}_2(x)]_+ + [\mathcal{D}_2(\mathcal{G}_1(z)) - \mathcal{D}_1(\mathcal{G}_1(z))]_+\} \quad (7)$$

Clamping forces the discriminator to get better at evaluating the generated samples, with each stage. As can be seen in FIG. 4, it takes a few iterations for clamping to stabilize when a new stage begins (this can be seen in the rise and fall of the upper and lower curves).

We claim:

1. A method for generating images using a generative network comprising:
   generating an image based on an input vector using the generative network;
   generating a discriminator loss representing the difference between the generated image and a real image represented by the input vector using a discriminator network; and
   producing a ranking loss between a current iteration and a subsequent iteration of the generative network using a ranker network;
   wherein the generator network, the discriminator network and the ranker network are optimized based on the discriminator loss and the ranking loss.

2. The method of claim 1 wherein the discriminator loss is a margin-based loss.

3. The method of claim 2 wherein the discriminator loss is represented by the equation:

$$\mathcal{L}_{disc} = [\mathcal{D}_{w_i}(\mathcal{G}_{\theta_i}(z)) + \epsilon - \mathcal{D}_{w_i}(x)]_+$$

wherein:
   $\mathcal{D}_{w_i}(\mathcal{G}_{\theta_i}(z))$ is a discriminator score for the generated image;
   $\epsilon$ is the margin; and
   $\mathcal{D}_{w_i}(x)$ is a discriminator score for the real image.

4. The method of claim 2 wherein the ranking loss is a margin-based loss based on the discriminator score for the generated image and the discriminator score for the real image from a subsequent iteration of the generative network.

5. The method of claim 4 wherein the ranking loss is represented by the equation:

$$\mathcal{L}_{rank} = [\mathcal{D}_{w_i}(\mathcal{G}_{\theta_i}(z)) + 2\epsilon - \mathcal{D}_{w_{i+1}}(x)]_+$$

wherein:
   $\mathcal{D}_{w_i}(\mathcal{G}_{\theta_i}(z))$ is the discriminator score for a generated image in the current iteration of the generative network;
   $2\epsilon$ is the margin; and
   $\mathcal{D}_{w_{i+1}}(x)$ is the discriminator score for the real image in a subsequent iteration of the generative network.

6. The method of claim 5 wherein the generative network, the discriminator network and the ranker network are further optimized based on a mean-squared error loss measured by a mean-squared error between the generated image and the real image.

7. The method of claim 6 wherein a total loss for the generative network is represented by the equation:

$$\mathcal{L}_{GoGAN} = \lambda_0 \cdot \mathcal{L}_{mse} + \lambda_1 \cdot \mathcal{L}_{disk} + \lambda_2 \mathcal{L}_{rank}$$

wherein $\lambda_0$, $\lambda_1$ and $\lambda_2$ are weighting parameters.

8. The method of claim 7 further comprising:
   encoding the real image to the input vector using an encoder network.

9. The method of claim 8 wherein the input vector is provided to the generative network and the discriminator network for calculation of the discriminator loss.

10. The method of claim 9 wherein the input vector is provided to the generative network and the ranking network for calculation of the ranking loss.

11. The method of claim 8 wherein the encoder network is updated using the total loss for the generative network.

12. A system for generating images using a generative network comprising:
   a processor; and
   software that, when executed by the processor, cause the system to implement:
   a generative network for generating an image based on an input vector;
   a discriminator network for generating a discriminator loss representing the difference between the generated image and a real image represented by the input vector; and
   a ranker network for producing a ranking loss between a current iteration and a subsequent iteration of the generative network;
   wherein the generator network, the discriminator network and the ranker network are optimized based on the discriminator loss and the ranking loss.

13. The system of claim 12 wherein the discriminator loss is a margin-based loss.

14. The system of claim 13 wherein the discriminator loss is represented by the equation:

$$\mathcal{L}_{disc} = [\mathcal{D}_{w_i}(\mathcal{G}_{\theta_i}(z)) + \epsilon - \mathcal{D}_{w_i}(x)]_+$$

wherein:
   $\mathcal{D}_{w_i}(\mathcal{G}_{\theta_i}(z))$ is a discriminator score for the generated image;
   $\epsilon$ is the margin; and
   $\mathcal{D}_{w_i}(x)$ is a discriminator score for the real image.

15. The system of claim 13 wherein the ranking loss is a margin-based loss based on the discriminator score for the generated image and the discriminator score for the real image from a subsequent iteration of the generative network.

16. The system of claim 15 wherein the ranking loss is represented by the equation:

$$\mathcal{L}_{rank} = [\mathcal{D}_{w_i}(\mathcal{G}_{\theta_i}(z)) + 2\epsilon - \mathcal{D}_{w_{i+1}}(x)]_+$$

wherein:
   $\mathcal{D}_{w_i}(\mathcal{G}_{\theta_i}(z))$ is the discriminator score for a generated image in the current iteration of the generative network;
   $2\epsilon$ is the margin; and
   $\mathcal{D}_{w_{i+1}}(x)$ is the discriminator score for the real image in a subsequent iteration of the generative network.

17. The system of claim 16 wherein the generative network, the discriminator network and the ranker network are further optimized based on a mean-squared error loss measured by a mean-squared error between the generated image and the real image.

18. The system of claim 17 wherein a total loss for the generative network is represented by the equation:

$$\mathcal{L}_{GoGAN} = \lambda_0 \cdot \mathcal{L}_{mse} + \lambda_1 \cdot \mathcal{L}_{disk} + \lambda_2 \mathcal{L}_{rank}$$

wherein $\lambda_0$, $\lambda_1$ and $\lambda_2$ are weighting parameters.

19. The system of claim 18 wherein the software further causes the system to implement:
an encoder network for encoding the real image to the input vector.

20. The system of claim 19 wherein:
the input vector is provided to the generator network and the discriminator network for calculation of the discriminator loss;
the input vector is provided to the generator network and the ranking network for calculation of the ranking loss; and
the encoder network is updated using the total loss for the generative network.

* * * * *